United States Patent
Tsukamoto et al.

(10) Patent No.: US 10,764,764 B2
(45) Date of Patent: *Sep. 1, 2020

(54) DISTRIBUTED ANTENNA SYSTEM

(71) Applicant: MITSUBISHI ELECTRIC CORPORATION, Tokyo (JP)

(72) Inventors: Kaoru Tsukamoto, Tokyo (JP); Naohiro Shinoda, Tokyo (JP); Hiroshi Nishimoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 106 days.

This patent is subject to a terminal disclaimer.

(21) Appl. No.: 16/072,448

(22) PCT Filed: Mar. 25, 2016

(86) PCT No.: PCT/JP2016/059758
§ 371 (c)(1),
(2) Date: Jul. 24, 2018

(87) PCT Pub. No.: WO2017/163424
PCT Pub. Date: Sep. 28, 2017

(65) Prior Publication Data
US 2019/0037415 A1    Jan. 31, 2019

(51) Int. Cl.
*H04W 40/00* (2009.01)
*H04W 16/28* (2009.01)
(Continued)

(52) U.S. Cl.
CPC ............ *H04W 16/28* (2013.01); *H04B 7/022* (2013.01); *H04B 7/0617* (2013.01); *H04B 7/10* (2013.01);
(Continued)

(58) Field of Classification Search
CPC ...... H04W 16/28; H04W 16/12; H04W 16/30; H04W 84/047; H04W 88/085;
(Continued)

(56) References Cited

U.S. PATENT DOCUMENTS 8,391,394 B2 * 3/2013 Yeon ................. H04B 7/0447
375/267
10,212,612 B2 * 2/2019 Tsukamoto ............ H01Q 1/32
(Continued)

FOREIGN PATENT DOCUMENTS

CN      102480316 B      12/2014
JP       10-108251 A      4/1998
(Continued)

OTHER PUBLICATIONS

International Search Report for PCT/JP2016/059758 (PCT/ISA/210) dated Jun. 21, 2016.
(Continued)

*Primary Examiner* — Marceau Milord
(74) *Attorney, Agent, or Firm* — Birch, Stewart, Kolasch & Birch, LLP

(57) ABSTRACT

A distributed antenna system includes a plurality of antenna groups which includes first antennas and second antennas. The first antennas form beams in a first direction along a mobile station track and transmit identical signals at identical frequencies. The second antennas form beams in a second direction opposite to the first direction and transmit identical signals at identical frequencies. The antenna groups are installed on one side of the mobile station track. A frequency of signals transmitted by the first antennas belonging to the same antenna group is different from a frequency of signals transmitted by the first antennas belonging to another antenna group adjacent thereto, a frequency of signals transmitted by the second antennas
(Continued)

belonging to the same antenna group is different from a frequency of signals transmitted by the second antennas belonging to another antenna group adjacent thereto, and the signals from the first antennas and the signals from the second antennas are transmitted using two frequencies in total.

4 Claims, 7 Drawing Sheets

(51) Int. Cl.
*H04B 7/10* (2017.01)
*H04B 7/022* (2017.01)
*H04B 7/06* (2006.01)
*H04W 16/30* (2009.01)
*H04W 16/12* (2009.01)
*H04W 84/04* (2009.01)
*H04W 88/08* (2009.01)

(52) U.S. Cl.
CPC ............ *H04W 16/12* (2013.01); *H04W 16/30* (2013.01); *H04W 84/047* (2013.01); *H04W 88/085* (2013.01)

(58) Field of Classification Search
CPC .......... H04B 7/0408; H04B 7/04; H04B 7/06; H04B 7/08; H04B 7/0491; H04B 7/0689; H04B 7/18534; H04B 7/022; H04B 7/0617; H04B 7/10
USPC .......... 455/447, 562.1, 277.1, 103, 293, 129
See application file for complete search history.

(56) References Cited

U.S. PATENT DOCUMENTS

| | | | |
|---|---|---|---|
| 2003/0122721 A1* | 7/2003 | Sievenpiper | H01Q 9/14 343/767 |
| 2007/0082672 A1* | 4/2007 | Fujioka | H04B 7/26 455/436 |
| 2007/0178832 A1* | 8/2007 | Gavrilovich | H04B 7/1555 455/11.1 |
| 2012/0134279 A1 | 5/2012 | Tamaki | |
| 2014/0062785 A1* | 3/2014 | Kim | G01S 7/032 342/368 |
| 2014/0203982 A1* | 7/2014 | Seo | H01Q 1/243 343/751 |
| 2017/0135111 A1* | 5/2017 | Nishimoto | H04W 72/0453 |

FOREIGN PATENT DOCUMENTS

| | | |
|---|---|---|
| JP | 2001-69067 A | 3/2001 |
| JP | 2002-237778 A | 8/2002 |
| JP | 2006-186872 A | 7/2006 |
| JP | 2012-15682 A | 1/2012 |
| WO | WO 2005/036825 A1 | 4/2005 |
| WO | WO 2007/142623 A8 | 12/2007 |

OTHER PUBLICATIONS

Nishimoto et al., "A Proposal for Millimeter-wave Linear Cell Concept Enabling High-speed Land-mobile Communications", B-5-77, 2015 IEICE, Mar. 10-13, 2015, p. 432.

Office Action issued in corresponding Indian Patent Application No. 201847033066 dated Jul. 15, 2020.

* cited by examiner

DISTRIBUTED ANTENNA SYSTEM

FIELD

The present invention relates to a distributed antenna system configured by a plurality of distributedly arranged antennas.

BACKGROUND

In a communication system assuming that a mobile station such as a train and an automobile traveling on a predetermined route performs radio communication with a base station, as described in Non Patent Literature 1, it is preferable that a base station equipped with directional antennas distributedly arranged along a traveling route of a mobile station be installed and the base station form an antenna beam along the traveling route. This makes it possible to configure an elongated cell along the traveling route, and to increase cell length while suppressing interference to other systems. A certain communication area, which is formed by transmission and reception of identical signals to and from a plurality of distributedly arranged antennas in synchronization at identical frequencies, is called a linear cell.

For example, the linear cell can be achieved in a form in which one communication modem is connected by an optical fiber or the like to a plurality of distributedly arranged antennas, or a form in which communication modems installed in antennas are synchronized with each other to have a common radio signal.

In a conventional multi-cell system including a plurality of cells, it is necessary to employ a frequency reuse factor of at least three in order to suppress inter-cell interference. On the other hand, by adopting a linear cell configuration, cell length can be increased and interference due to overreach is reduced, so that it is possible to construct a system employing a frequency reuse factor of two as indicated in Non Patent Literature 1, and frequency utilization efficiency is improved. Overreach is a phenomenon in which a signal transmitted from an antenna of a base station in a certain cell reaches a next adjacent cell beyond an adjacent cell.

CITATION LIST

Non Patent Literature

Non Patent Literature 1: Hiroshi Nishimoto, et al. "A Proposal for Millimeter-wave Linear Cell Concept Enabling High-speed Land-mobile Communications", The Institute of Electronics, Information and Communication Engineers, General Conference, B-5-77, March 2015

SUMMARY

Technical Problem

In the technique described in Non Patent Literature 1, a different frequency is used for each linear cell, and therefore, in a linear cell, a frequency of an adjacent linear cell thereof cannot be used. Consequently, the frequency utilization efficiency of the whole system is only 50%.

The present invention has been made in view of the above, and an object thereof is to obtain a distributed antenna system capable of improving frequency utilization efficiency in a wireless communication system including a plurality of linear cells.

Solution to Problem

A distributed antenna system according to an aspect of the present invention includes a plurality of antenna groups each of which includes a plurality of first antennas which forms beams in a first direction along a mobile station track which is a track for a mobile station and transmit identical signals at identical frequencies and a plurality of second antennas which forms beams in a second direction opposite to the first direction and transmit identical signals at identical frequencies. The antenna groups are installed on one side of the mobile station tracks. A frequency of signals transmitted by the first antennas belonging to a same antenna group is different from a frequency of signals transmitted by other first antennas belonging to another antenna group adjacent thereto, a frequency of signals transmitted by the second antennas belonging to a same antenna group is different from a frequency of signals transmitted by other second antennas belonging to another antenna group adjacent thereto, and the signals from the first antennas and the signals from the second antennas are transmitted using two frequencies in total.

Advantageous Effects of Invention

According to the present invention, it is possible to achieve a distributed antenna system capable of improving frequency utilization efficiency.

DESCRIPTION OF EMBODIMENTS

Hereinafter, a distributed antenna system according to each embodiment of the present invention will be described in detail with reference to the drawings. The invention is not limited to the embodiments.

First Embodiment

Figure 1:
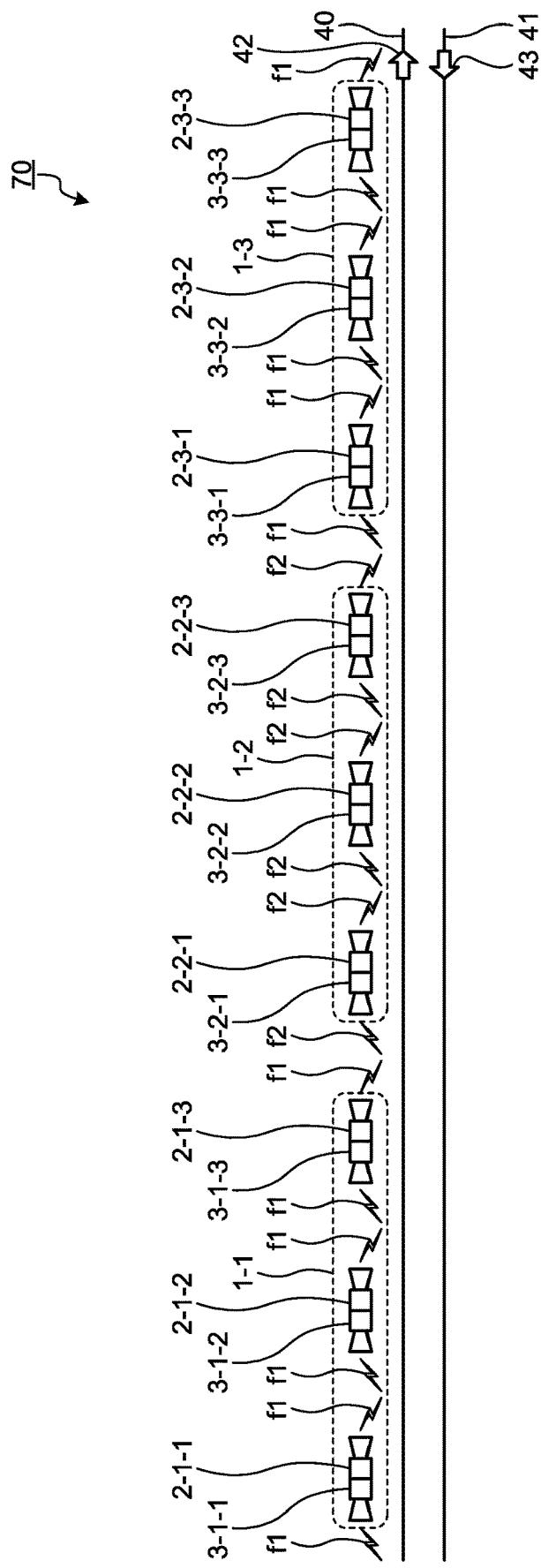
FIG. 1 is a diagram illustrating a configuration example of a distributed antenna system according to a first embodiment.

FIG. 1 is a diagram illustrating a configuration example of a distributed antenna system according to a first embodiment of the present invention. The distributed antenna system 70 according to the first embodiment forms a mobile communication system together with a base station (not illustrated). As illustrated in FIG. 1, the distributed antenna system 70 according to the first embodiment includes a plurality of antennas 2-$c$-$n$ and 3-$c$-$n$ installed along mobile station tracks 40 and 41, which are tracks for mobile stations (c=1, 2, 3, . . . , n=1, 2, 3, . . . ). The mobile station is a radio communication device mounted on a mobile object which travels in a predetermined direction, such as a railroad vehicle or an automobile. The antennas 2-$c$-$n$ and 3-$c$-$n$ are connected to a base station (not illustrated), receive a signal for a mobile station output from the base station, and transmit the signal as a radio signal. In addition, the antennas 2-$c$-$n$ and 3-$c$-$n$ receive a radio signal transmitted from the mobile station to the base station, and relay the radio signal to the base station.

In the distributed antenna system 70, each of antenna groups 1-$c$ is an antenna group including a set of a plurality of consecutive antennas 2-$c$-$n$ and a plurality of consecutive antennas 3-$c$-$n$. Here, reference character "c" indicates an antenna group index, and reference character "n" indicates an antenna index in the antenna group, each of which is numbered 1, 2, 3, . . . , starting from the left side of FIG. 1. The reference character "n" of the antennas 2-$c$-$n$ is not always need to be the same a as that of the antennas 3-$c$-$n$.

The antennas 2-$c$-$n$ and 3-$c$-$n$ are installed along the mobile station track 40 on a side opposite to the mobile station track 41, or along the mobile station track 41 on a side opposite to the mobile station track 40. That is, the antennas 2-$c$-$n$ and 3-$c$-$n$ are installed on either side of the mobile station track 40 or 41.

Figure 2:
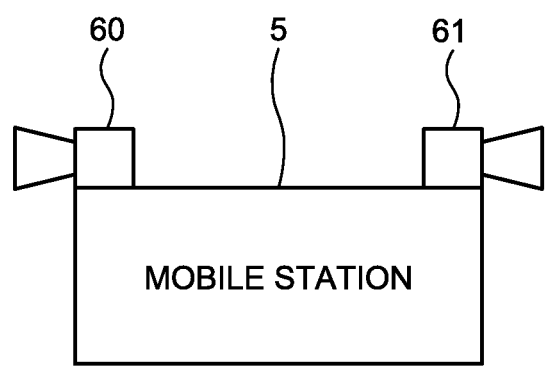
FIG. 2 is a diagram illustrating a configuration example of a mobile station according to the first embodiment.

The mobile station tracks 40 and 41 are tracks along which the mobile station 5 illustrated in FIG. 2 travels and the mobile station 5 travels in a certain direction on the mobile station track 40 or 41. Here, as an example, when traveling on the mobile station track 40, the mobile station 5 travels in the rightward direction in FIG. 1, that is, in the direction indicated by an arrow 42. When traveling on the mobile station track 41, the mobile station 5 travels in the leftward direction in FIG. 1, that is, in the direction indicated by an arrow 43.

The antennas 2-$c$-$n$ and 3-$c$-$n$ are directional antennas and each form a beam in a traveling direction of the mobile station 5. The antennas 2-$c$-$n$ and the antennas 3-$c$-$n$ are installed so that directivities thereof are set in directions opposite to each other. Here, the antennas 2-$c$-$n$ each form a beam in the rightward direction in FIG. 1, that is, the direction indicated by the arrow 42, and the antennas 3-$c$-$n$ each form a beam in the leftward direction in FIG. 1, that is, the direction indicated by the arrow 43. As an example, the antennas 2-$c$-$n$ and the antennas 3-$c$-$n$ are installed back to back at the same position.

The antennas 2-$c$-$n$ in each antenna group 1-$c$ are connected to one modulator included in a base station (not illustrated) via signal lines (not illustrated). Similarly, the antennas 3-$c$-$n$ in the antenna group 1-$c$ are connected via signal lines (not illustrated) to one modulator (not illustrated) different from the modulator to which the antennas 2-$c$-$n$ are connected, or to output ports of the modulator to which the antennas 2-$c$-$n$ are connected, the output ports being different from output ports to which the antennas 2-$c$-$n$ are connected. Here, regarding the signal line connecting the modulator and each antenna, any medium may be employed as long as the signal line is a wired cable capable of transmitting a signal such as a coaxial cable and an optical fiber.

The antennas 2-$c$-$n$ belonging to the same antenna group transmit identical signals S2 at identical frequencies to form one line-shaped cell. That is, one line-shaped cell is formed by the antennas 2-$c$-$n$ belonging to one antenna group 1-$c$. The line-shaped cells are also called linear cells. The antennas 3-$c$-$n$ belonging to the same antenna group transmit identical signals S3 at the same frequency as the frequency of the signals transmitted from the antennas 2-$c$-$n$ belonging to the same antenna group to form one line-shaped cell. That is, one line-shaped cell is formed by the antennas 3-$c$-$n$ belonging to one antenna group 1-$c$. However, the signals S2 and signals S3 respectively transmitted by the antennas 2-$c$-$n$ and 3-$c$-$n$ that are belonging to the same antenna group, are different signals (S2≠S3). That is, in one antenna group, signals transmitted by the antennas 2-$c$-$n$ and signals transmitted by the antennas 3-$c$-$n$ transmit are different signals.

Antenna groups adjacent to each other use different frequencies, an identical frequency is used by an antenna group and a next adjacent antenna group, that is, by neighboring antenna groups interposing one antenna group therebetween, and a frequency reuse factor is two. For example, when a transmission frequency used by antennas 2-1-$n$ and 3-1-$n$ belonging to an antenna group 1-1 is represented as f1, a transmission frequency used by antennas 2-2-$n$ and 3-2-$n$ belonging to an antenna group 1-2 is represented as f2 (≠f1), and a transmission frequency used by antennas 2-3-$n$ and 3-3-$n$ belonging to an antenna group 1-3 is f1.

The mobile station 5 includes antennas 60 and 61, which are directional antennas. One of the antennas 60 and 61 forms a beam in a traveling direction of the mobile station 5. The other of the antennas 60 and 61 forms a beam in the reverse direction of the traveling direction of the mobile station 5, that is, in a direction opposite to the traveling direction of the mobile station 5. Here, the antenna 60 forms a beam in the leftward direction in FIG. 1, that is, the direction indicated by the arrow 43, and the antenna 61 forms a beam in the rightward direction in FIG. 1, that is, the direction indicated by the arrow 42. That is, the antenna 60 of the mobile station 5 can receive radio waves from the antennas 2-$c$-$n$, and the antenna 61 can receive radio waves from the antennas 3-$c$-$n$. Here, the antennas 2-$c$-$n$, 3-$c$-$n$, 60, and 61 are directional antennas with a narrow beam width, and influence of radio waves from antennas other than directly facing antennas, that is, reflected waves, is negligible.

As described above, the distributed antenna system according to the present embodiment employs the configuration in which sets of two antennas having directivity directions opposite to each other are distributedly arranged along the mobile station tracks, one antenna group is formed by a plurality of sets of consecutive antennas, antennas in the same antenna group use an identical frequency, and antennas having the same directivity direction transmit identical signals to form a linear cell. In addition, the distributed antenna system according to the present embodiment employs a two-frequency reuse configuration in which antenna groups adjacent to each other are set to use transmission frequencies different to each other. This makes it possible to double a transmission speed without adding a frequency as compared with a case where the directivity direction is only one direction. Thus, the frequency utilization efficiency in the mobile communication system can be improved by applying the distributed antenna system according to the present embodiment.

Radio waves radiated from antennas with different directivity directions may be radio waves whose polarization planes are orthogonal to each other. As an example, radio waves radiated by the antennas 2-$c$-$n$ may be vertically polarized waves and radio waves radiated by the antennas 3-$c$-$n$ may be horizontally polarized waves. At that time, regarding the polarization planes of the antennas included in the mobile station 5, the antenna 60 is vertically polarized and the antenna 61 is horizontally polarized. The combination of the polarizations is not limited thereto, and any combinations may be used as long as the orthogonality can be achieved. A combination of a vertically polarized antenna tilted to the right by 45° and a vertically polarized antenna tilted to the left by 45° may be employed, or a combination of a right-hand circularly polarized antenna and a left-hand circularly polarized antenna may be employed.

It is possible to reduce interference between identical frequencies used by antennas with different directivity directions by orthogonalizing polarization planes of radio waves radiated from two sets of antennas with different directivity directions, and consequently, communication quality can be improved.

In the description of FIG. 1, for the sake of simplicity, the number of antennas 2-$c$-$n$ and the number of antennas 3-$c$-$n$ belonging to each antenna group 1-$c$ are three. However, there is no limitation thereto, and the numbers may be an arbitrary integer of 2 or more.

In the above description, the signal transmitted by each of the antennas 2-$c$-$n$ and the signal transmitted by each of the antennas 3-$c$-$n$ are different to each other, but these signals are not always necessary to be different signals. The signals may be different signals when large-capacity data such as a moving image is transmitted, and may be identical signals when data requiring high reliability such as a control signal is transmitted. This makes it possible to improve transmission capacity during large-capacity data transmission and to improve reliability during reliable data transmission.

In the above description, the antennas 2-$c$-$n$ and the antennas 3-$c$-$n$ are installed at the same position. However, the installation thereof is not necessarily limited thereto, and the antennas 2-$c$-$n$ and the antennas 3-$c$-$n$ may be installed at positions distant from each other.

Second Embodiment

Figure 3:
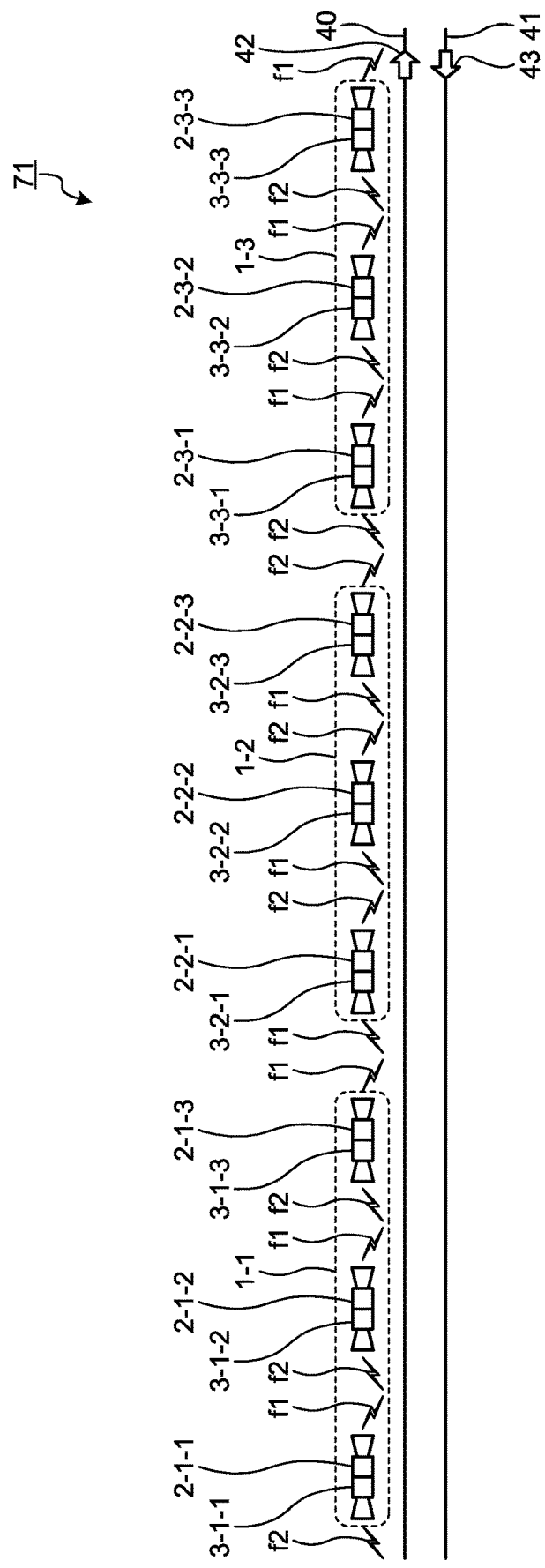
FIG. 3 is a diagram illustrating a configuration example of a distributed antenna system according to a second embodiment.

FIG. 3 is a diagram illustrating a configuration example of a distributed antenna system according to a second embodiment of the present invention. The distributed antenna system 71 according to the second embodiment is obtained by changing the transmission frequencies of the antennas 2-$c$-$n$ and 3-$c$-$n$ included in the distributed antenna system 70 illustrated in FIG. 1 described in the first embodiment. In the present embodiment, parts different from the parts in the first embodiment will be described, and descriptions of the same parts as the parts in the first embodiment will be omitted.

In the distributed antenna system 71 according to the present embodiment, signals of different frequencies are transmitted from antennas with different directivity directions in the same antenna group of index c and. That is, the transmission frequency of the antennas 2-$c$-$n$ and the transmission frequency of the antennas 3-$c$-$n$ are set to be values different to each other. With respect to antenna groups adjacent to each other, different transmission frequencies are assigned to antennas with the same directivity direction. When the transmission frequency used by the antennas 2-1-$n$ belonging to the antenna group 1-1 is represented as f1, as an example, the transmission frequency used by the antennas 3-1-$n$ belonging to the antenna group 1-1 and the transmission frequency of the antennas 2-2-$n$ belonging to the antenna group 1-2 are represented as f2 ($\neq$f1). The transmission frequency of the antennas 3-2-$n$ belonging to the antenna group 1-2 is f1.

As described above, the distributed antenna system according to the present embodiment employs the configuration in which the transmission frequencies used by antennas with different directivity directions are set to be different to each other, in contrast to the configuration of the first embodiment. This makes it possible to simultaneously use two frequencies that are repeatedly used in antenna groups, and to double a transmission speed similarly to the first embodiment. In addition, an area where interference between identical frequencies may occur can be limited only to boundaries of linear cells instead of the whole area along the railroad, which makes it possible to improve communication quality as compared with the first embodiment.

Third Embodiment

Figure 4:
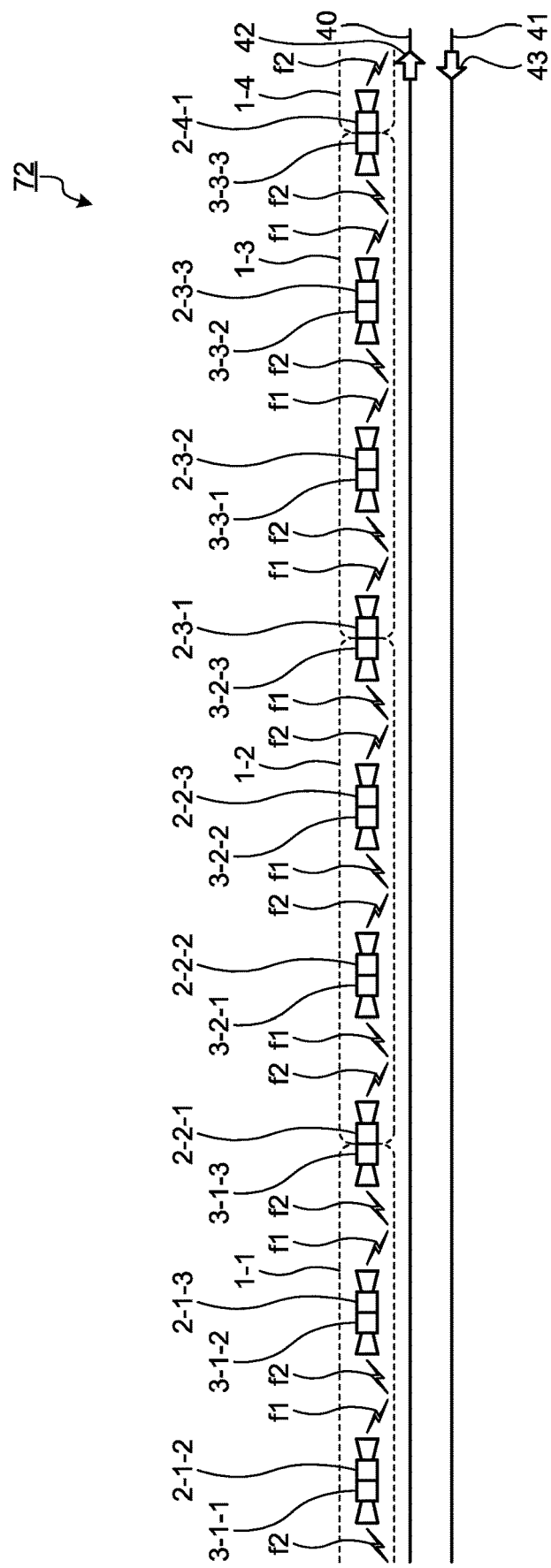
FIG. 4 is a diagram illustrating a configuration example of a distributed antenna system according to a third embodiment.

FIG. 4 is a diagram illustrating a configuration example of a distributed antenna system according to a third embodiment of the present invention. The distributed antenna system 72 according to the third embodiment is obtained by changing positions of boundaries of the antenna groups 1-$c$ of the distributed antenna system 71 illustrated in FIG. 3 described in the second embodiment. In the present embodiment, parts different from the parts in the second embodiment will be described, and descriptions of the same parts as the parts in the second embodiment will be omitted.

In the second embodiment, the antennas 2-$c$-$n$ and 3-$c$-$n$ installed at the same position belong to the same antenna group 1-$c$. However, in the present embodiment, only boundary portions of the antenna groups, that is, two antennas installed at the same position belong to different antenna groups. At that time, among antennas 2-($c$+1)-$n$ belonging to each antenna group 1-($c$+1), an antenna 2-($c$+1)-1 at an end in a direction opposite to the directivity direction, and among antennas 3-$c$-$n$ belonging to each antenna group 1-$c$, an antenna 3-$c$-N at an end in a direction opposite to the directivity direction are installed at the same position. Here, N is the number of antennas 3-$c$-$n$ in the antenna group 1-$c$, and N=3 in FIG. 4. As an example, antennas 2-2-1 and 3-1-3 are installed at the same position. At that time, antennas 2-1-($n$+1) and 3-1-$n$ (in which n=1, 2 (=N−1)) are installed at the same position.

As described above, in the distributed antenna system according to the present embodiment, two antennas installed at the same position belong to different antenna groups, regarding boundaries of the antenna groups in contrast to the configuration of the second embodiment. This makes it possible to set the frequency of radio waves coming from the front of the mobile station and the frequency of radio waves coming from the back of the mobile station to be different values in the whole area along the railroad, so the possibility of occurrence of interference between identical frequencies decreases in the whole area along the railroad, and the communication quality can be further improved as compared with the communication quality in the second embodiment.

Fourth Embodiment

Figure 5:
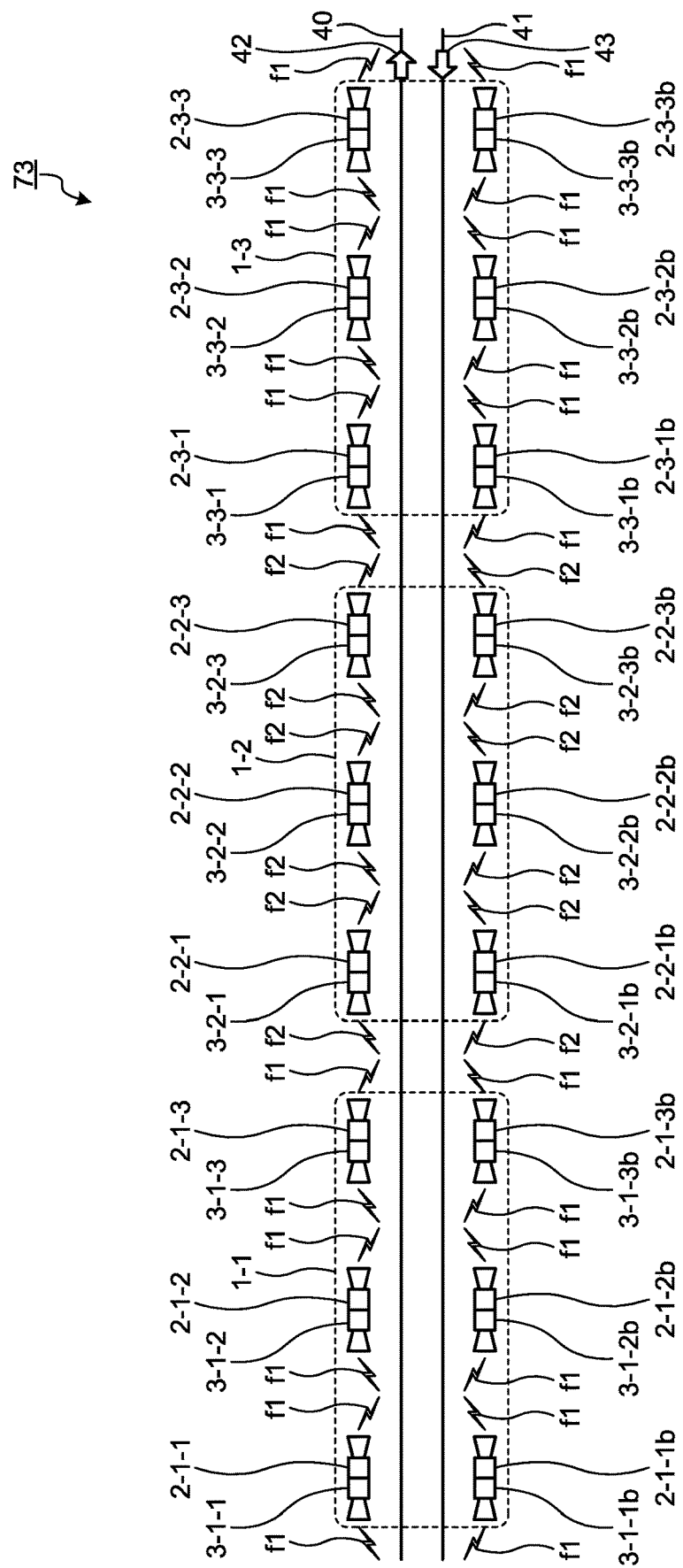
FIG. 5 is a diagram illustrating a configuration example of a distributed antenna system according to a fourth embodiment.

FIG. 5 is a diagram illustrating a configuration example of a distributed antenna system according to a fourth embodiment of the present invention. The distributed antenna system 73 according to the fourth embodiment includes the antennas 2-*c-nb* and 3-*c-nb* having the same function as those of the respective antennas 2-*c-n* and 3-*c-n* included in the distributed antenna system 70 illustrated in FIG. 1 described in the first embodiment. The antennas 2-*c-nb* and 3-*c-nb* are installed on a side opposite to the mobile station track along which the antennas 2-*c-n* and 3-*c-n* are installed. In the present embodiment, parts different from the parts in the first embodiment will be described, and descriptions of the same parts as the parts in the first embodiment will be omitted.

The antennas 2-*c-nb* in each antenna group 1-*c* are connected to one modulator included in a base station (not illustrated) via signal lines (not illustrated). Here, the modulator connected to the antennas 2-*c-nb* in the antenna group 1-*c* is the same modulator as that connected to the antennas 2-*c-n* in the antenna group 1-*c*. The modulator to which antennas 2-*c-n* and 2-*c-nb* are connected generates two systems of transmission signals which have been subjected to two-branch transmit diversity encoding, such as a Space Time Block Code (STBC), a Differential STBC (DSTBC), a Space Frequency Block Code (SFBC), and a Differential SFBC (DSFBC).

A first transmission signal which is one of the two systems of transmission signals generated by the modulator is transmitted from the antennas 2-*c-n*, and a second transmission signal which is the other of the two systems of transmission signals generated by the modulator is transmitted from the antennas 2-*c-nb*. However, it is not necessary to transmit the first transmission signal from all the antennas 2-*c-n* in the antenna group 1-*c*, and the systems of the transmission signals may be different for each antenna index n. As an example, the first transmission signal may be transmitted from an antenna 2-*c*-1 and the second transmission signal may be transmitted from an antenna 2-*c*-2. At that time, the second transmission signal is transmitted from an antenna 2-*c*-1*b*, and the first transmission signal is transmitted from an antenna 2-*c*-2*b*. That is, two-branch transmit diversity is achieved by each of the antennas 2-*c-n* and corresponding one of the antennas 2-*c-nb*. Here, a coding scheme for achieving the transmit diversity may be any scheme. For example, an existing coding scheme such as an Alamouti's code in the STBC can be used. Regarding the signal line, any medium may be employed as long as the signal line is a wired cable capable of transmitting a signal such as a coaxial cable and an optical fiber.

Similarly, the antennas 3-*c-nb* in the antenna group 1-*c* are connected to one modulator included in a base station (not illustrated) via signal lines (not illustrated). Here, the modulator connected to the antennas 3-*c-nb* in the antenna group 1-*c* is the same modulator as that connected to the antennas 3-*c-n* in the antenna group 1-*c*. The modulator to which the antennas 3-*c-n* and 3-*c-nb* are connected generates two systems of transmission signals that are different from signals which are transmitted by the antennas 2-*c-n* and 2-*c-nb* and have been subjected to two-branch transmit diversity encoding such as STBC, DSTBC, SFBC and DSFBC.

A first transmission signal which is one of the two systems of transmission signals generated by the modulator is transmitted from the antennas 3-*c-n*, and a second transmission signal which is the other of the two systems of transmission signals generated by the modulator is transmitted from the antennas 3-*c-nb*. However, it is not necessary to transmit the first transmission signal from all the antennas 3-*c-n* in the antenna group 1-*c*, and the systems of the transmission signals may be different for each antenna index n. As an example, the first transmission signal may be transmitted from an antenna 3-*c*-1 and the second transmission signal may be transmitted from an antenna 3-*c*-2. At that time, the second transmission signal is transmitted from an antenna 3-*c*-1*b*, and the first transmission signal is transmitted from an antenna 3-*c*-2*b*. That is, two-branch transmit diversity is achieved by each of the antennas 3-*c-n* and corresponding one of the antennas 3-*c-nb*. Here, a coding scheme for achieving the transmit diversity may be any scheme. For example, an existing coding scheme such as an Alamouti's code in the STBC can be used. Regarding the signal line, any medium may be employed as long as the signal line is a wired cable capable of transmitting a signal such as a coaxial cable and an optical fiber.

As described above, the distributed antenna system according to the present embodiment employs the configuration in which antennas are installed on each side of two mobile station tracks, and two-branch transmit diversity is performed with one set of antennas installed across the mobile station tracks, in contrast to the configuration of the first embodiment. This makes it possible to improve communication quality as compared with the first embodiment. In addition, communication interruption due to mobile stations passing each other can be suppressed.

Fifth Embodiment

Figure 6:
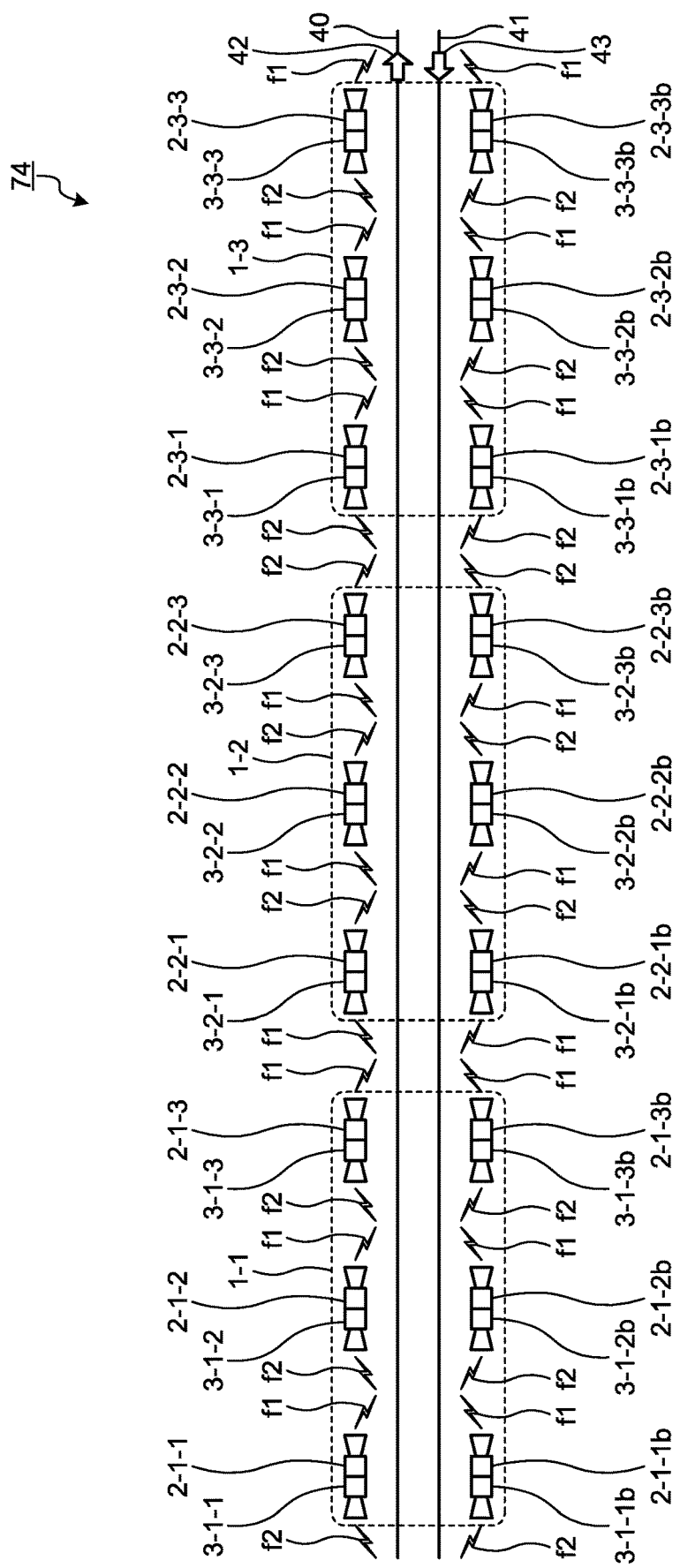
FIG. 6 is a diagram illustrating a configuration example of a distributed antenna system according to a fifth embodiment.

FIG. 6 is a diagram illustrating a configuration example of a distributed antenna system according to a fifth embodiment of the present invention. The distributed antenna system 74 according to the fifth embodiment is obtained by changing the transmission frequencies used by the antennas 2-*c-n*, 2-*c-nb*, 3-*c-n*, and 3-*c-nb* included in the distributed antenna system 73 illustrated in FIG. 5 described in the fourth embodiment. In the present embodiment, parts different from the parts in the fourth embodiment will be described, and descriptions of the same parts as the parts in the fourth embodiment will be omitted.

In the distributed antenna system 74 according to the present embodiment, signals of different frequencies are transmitted from antennas with the same antenna group index c and different directivity directions. That is, the transmission frequencies used by the antennas 2-*c-n* and 2-*c-nb*, and the transmission frequencies used by the antennas 3-*c-n* and 3-*c-nb* are set to be different values. Regarding antenna groups adjacent to each other, different transmission frequencies are assigned to antennas with the same directivity direction. As an example, when a transmission frequency used by the antennas 2-1-*n* and antennas 2-1-*nb* belonging to the antenna group 1-1 is represented as f1, a transmission frequency used by the antennas 3-1-*n* and antennas 3-1-*nb* belonging to the antenna group 1-1, and a transmission frequency used by the antennas 2-2-*n* and antennas 2-2-*nb* belonging to the antenna group 1-2 are represented as f2 ($\neq$f1). The transmission frequency used by the antennas 3-2-*n* and antennas 3-2-*nb* belonging to the antenna group 1-2 is f1. That is, a configuration is employed in which the antennas 2-*c-nb* and 3-*c-nb* having the same functions as the respective antennas 2-*c-n* and 3-*c-n* included in the distributed antenna system 71 illustrated in FIG. 3 described in the second embodiment are installed, similarly to the fourth embodiment, on a side opposite to the mobile station track along which the antennas 2-*c-n* and 3-*c-n* are installed.

As described above, the distributed antenna system according to the present embodiment employs the configuration in which antennas are installed at each side of two mobile station tracks, and two-branch transmit diversity is performed with one set of antennas installed across the mobile station tracks, in contrast to the configuration of the second embodiment. This makes it possible to improve communication quality as compared with the second embodiment. In addition, communication interruption due to mobile stations passing each other can be reduced.

Sixth Embodiment

Figure 7:
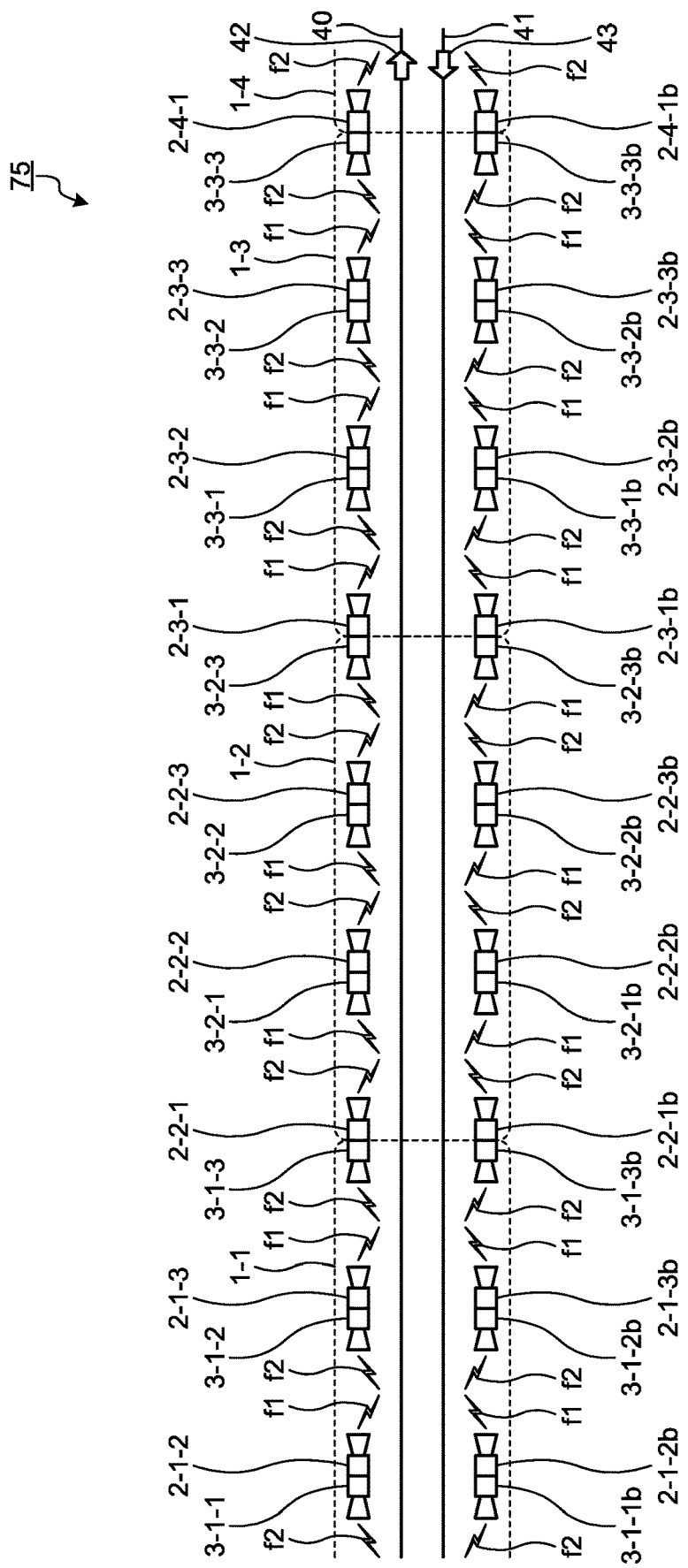
FIG. 7 is a diagram illustrating a configuration example of a distributed antenna system according to a sixth embodiment.

FIG. 7 is a diagram illustrating a configuration example of a distributed antenna system according to a sixth embodiment of the present invention. The distributed antenna system 75 according to the sixth embodiment is obtained by changing positions of boundaries of the antenna groups 1-$c$ of the distributed antenna system 74 illustrated in FIG. 6 described in the fifth embodiment. In the present embodiment, parts different from the parts in the fifth embodiment will be described, and descriptions of the same parts as the parts in the fifth embodiment will be omitted.

In the fifth embodiment, the antennas 2-$c$-$n$ and 3-$c$-$n$ as well as the antennas 2-$c$-$nb$ and 3-$c$-$nb$, which are installed at the same position, belong to the same antenna group 1-$c$. However, in the present embodiment, antennas among the antennas 2-$c$-$n$ and 3-$c$-$n$ as well as the antennas 2-$c$-$nb$ and 3-$c$-$nb$, which are installed at the same position, belong to different antenna groups only in boundary portions of the antenna groups. At that time, among the antennas 2-($c$+1)-$n$ and antennas 2-($c$+1)-$nb$ belonging to each antenna group 1-($c$+1), the antenna 2-($c$+1)-1 and an antenna 2-($c$+1)-1$b$ at an end in a direction opposite to the directivity direction, and among the antennas 3-$c$-$n$ and 3-$c$-$nb$ belonging to each antenna group 1-$c$, the antenna 3-$c$-N and an antenna 3-$c$-Nb at an end in a direction opposite to the directivity direction are installed at the same position. Here, N is the number of antennas 3-$c$-$n$ in the antenna group 1-$c$, and N=3 in FIG. 7. As an example, the antennas 2-2-1 and 3-1-3 are installed at the same position, and antennas 2-2-1$b$ and 3-1-3$b$ are installed at the same position. At that time, the antennas 2-1-($n$+1) and 3-1-$n$ (in which n=1, 2 (=N−1)) are installed at the same position and antennas 2-1-($n$+1)b and 3-1-$nb$ (in which n=1, 2 (=N−1)) are installed at the same position. That is, a configuration is employed in which the antennas 2-$c$-$nb$ and 3-$c$-$nb$ having the same functions as the respective antennas 2-$c$-$n$ and 3-$c$-$n$ included in the distributed antenna system 72 illustrated in FIG. 4 described in the third embodiment are installed, similarly to the fifth embodiment, on a side opposite to the mobile station track along which the antennas 2-$c$-$n$ and 3-$c$-$n$ are installed.

As described above, the distributed antenna system according to the present embodiment employs the configuration in which antennas are installed at each side of two mobile station tracks, and two-branch transmit diversity is performed with one set of antennas installed across the mobile station tracks, in contrast to the configuration of the third embodiment. This makes it possible to improve communication quality as compared with the third embodiment. In addition, communication interruption due to mobile stations passing each other can be suppressed.

In each of the embodiments, the case has been described in which the numbers of antennas belonging to antenna groups are the same, but there is no limitation thereto. The numbers of antennas belonging to antenna groups may be different for each antenna group.

The configuration described in the embodiments above indicates one example of the content of the present invention and can be combined with other known technology, and a part thereof can be omitted or modified without departing from the gist of the present invention.

REFERENCE SIGNS LIST 1-1 to 1-4 antenna group; 2-1-1 to 2-3-3, 2-4-1, 2-1-1$b$ to 2-3-3$b$, 2-4-1$b$, 3-1-1 to 3-3-3, 3-1-1$b$ to 3-3-3$b$, 60, 61 antenna; 40, 41 mobile station track; 5 mobile station; 70 to 75 distributed antenna system.

The invention claimed is:
1. A distributed antenna system comprising:
a plurality of antenna groups each of which includes a plurality of first antennas to form beams in a first direction along a mobile station track that is a track for a mobile station and to transmit identical signals at identical frequencies and a plurality of second antennas to form beams in a second direction opposite to the first direction and to transmit identical signals at identical frequencies, wherein
the antenna groups are installed on one side of the mobile station track,
a frequency of signals transmitted by the first antennas belonging to a same antenna group is different from a frequency of signals transmitted by other first antennas belonging to another antenna group adjacent thereto,
a frequency of signals transmitted by the second antennas belonging to a same antenna group is different from a frequency of signals transmitted by other second antennas belonging to another antenna group adjacent thereto, and
the signals from the first antennas and the signals from the second antennas are transmitted using two frequencies in total, wherein
in each of the antenna groups, a frequency of the signals transmitted by the first antennas and a frequency of the signals transmitted by the second antennas are set to be different, and
in each of the antenna groups, the second antenna is located at a first boundary that is a boundary with another antenna group adjacent in the first direction, the first antenna is located at a second boundary that is a boundary with still another antenna group adjacent in the second direction, and
among the first antennas and the second antennas belonging to a same antenna group, the first antenna located at the second boundary is installed at a same position as the second antenna belonging to the another antenna group, the second antenna located at the first boundary is installed at a same position as the first antenna belonging to the still another antenna group, and among the first antennas and the second antennas belonging to the same antenna group, one of the first antennas and one of the second antennas that are not located at boundaries with the other antenna groups are installed at a same position.

2. The distributed antenna system according to claim 1, comprising a plurality of second antenna groups having a same configuration as first antenna groups that are the antenna groups, wherein
the second antenna groups are installed on a side of the mobile station track different from a side on which the first antenna groups are installed, and
transmit diversity is performed by the first antennas of the first antenna groups and the first antennas of the second antenna groups that face each other across the mobile station track, and transmit diversity is performed by the second antennas of the first antenna groups and the second antennas of the second antenna groups that face each other across the mobile station track.

3. The distributed antenna system according to claim 2, wherein
the first antennas and the second antennas belonging to the same antenna group transmit identical data during reliable data transmission, and the first antennas and the second antennas belonging to the same antenna group transmit different data during large-capacity transmission.

4. The distributed antenna system according to claim 1, wherein
the first antennas and the second antennas belonging to the same antenna group transmit identical data during reliable data transmission, and the first antennas and the second antennas belonging to the same antenna group transmit different data during large-capacity transmission.

* * * * *